United States Patent [19]

Suzuki et al.

[11] Patent Number: 4,905,106
[45] Date of Patent: Feb. 27, 1990

[54] DEVICE FOR DETECTING LIGHT TRANSMISSIVITY OF DETECTED OBJECT AND RECORD AND/OR REPRODUCING APPARATUS USING SAME

[75] Inventors: Koichiro Suzuki, Kanagawa; Toshihiro Sugikubo, Tokyo, both of Japan

[73] Assignee: Canon Kabushiki Kaisha, Tokyo, Japan

[21] Appl. No.: 356,635

[22] Filed: May 22, 1989

Related U.S. Application Data

[63] Continuation of Ser. No. 89,069, Aug. 25, 1987, abandoned.

[30] Foreign Application Priority Data

Aug. 28, 1986 [JP] Japan ............................ 61-131956[U]
Aug. 28, 1986 [JP] Japan ............................ 61-131958[U]

[51] Int. Cl.$^4$ ............................................. G11B 15/48
[52] U.S. Cl. ....................................... 360/74.6; 360/71
[58] Field of Search ................... 360/74.6, 74.5, 74.1, 360/71

[56] References Cited

U.S. PATENT DOCUMENTS 4,570,075  2/1986  Spiero ................................. 360/74.6
4,570,876  2/1986  Andoh et al. ........................ 360/74.6

FOREIGN PATENT DOCUMENTS 61-137247  6/1986  Japan ................................. 360/74.6

Primary Examiner—John H. Wolff
Assistant Examiner—Matthew J. Bussan
Attorney, Agent, or Firm—Robin, Blecker, Daley & Driscoll

[57] ABSTRACT

A device for detecting the light transmissivity of an object to be detected comprises a light emitting element and a light receiving element which are opposed to each other across the detected object. The device is arranged to cause the light emitting element to intermittently emit a light and to detect the light transmissivity of said detected object on the basis of a detection signal obtained from the light receiving element when the light is emitted by the light emitting element and another detection signal obtained from the light receiving element when no light is emitted by the light emitting element.

5 Claims, 5 Drawing Sheets

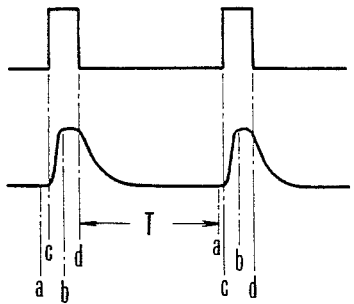

DEVICE FOR DETECTING LIGHT TRANSMISSIVITY OF DETECTED OBJECT AND RECORD AND/OR REPRODUCING APPARATUS USING SAME

This application is a continuation, of application Ser. No. 089,069, filed Aug. 25, 1987 now abandoned.

BACKGROUND OF THE INVENTION

1. Field of the Invention

This invention relates to a device for detecting the light transmissivity of an object to be detected and a recording and/or reproducing apparatus using the same.

2. Description of the Related Art

The detecting devices of the above stated kind have been known including the tape-end detecting device which is used for a recording and/or reproducing apparatus such as a video tape recorder (hereinafter referred to as VTR). In the case of the VTR using such a device, an opaque magnetic tape which is placed within a cassette is provided with transparent leader tape parts at both ends thereof. Either a light emitting element or a light receiving element is inserted into the cassette. Meanwhile a light receiving element or a light emitting element is opposed to the inserted element across the magnetic tape. The end of the tape is thus arranged to be detected by detecting the emitted light of the light emitting element passing through the leader tape part by means of the light receiving element.

However, the photo-sensitive element which is employed as the light receiving element is responsive to light of any kind. If the light receiving element happens to be irradiated over a certain length of time by a leak of an external light inside the VTR, therefore, the tape would be erroneously determined to have come to its end. In the event of a VTR arranged to stop the tape from travelling upon detection of the end thereof, the tape travel would untimely be brought to a stop during the process of recording or reproduction by such erroneous detection due to an external light. To avoid this, the VTR must be designed to shut out any external light or to have the light receiving element in a position to be free from any external light. However, this requirement has narrowed allowable latitude in designing the VTR.

SUMMARY OF THE INVENTION

This invention is directed to the solution of the above stated problem of the prior art. It is therefore an object of the invention to provide a device which is capable of accurately detecting the light transmissivity of an object to be detected even in the event of a leak of external light.

Under this object, a device arranged according to this invention as an embodiment thereof to detect the light transmissivity of an object to be detected comprises: a light emitting element arranged to intermittently emit light; a light receiving element which is opposed to the light emitting element across the object to be detected and is arranged to produce an electrical signal corresponding to the quantity of light received; and means for determining the light transmissivity of the object on the basis of an electrical signal produced from the light receiving element at a first timing within a period during which the light emitting element is emitting the light and also another electrical signal produced from the light receiving element at a second timing within a period during which the light emitting element is not emitting the light.

It is another object of this invention to provide a detecting device which is adapted for detecting the transmissivity of an object to be detected and is capable of accurately and promptly detecting the light transmissivity of the object.

Under that object, a device arranged according to this invention as an embodiment thereof to detect the light transmissivity of an object to be detected comprises: a light emitting element arranged to intermittently emit light; a light receiving element which is opposed to the light emitting element across the object to be detected and is arranged to produce an electrical signal corresponding to the quantity of light received; and means for determining the light transmissivity of the object on the basis of an electrical signal periodically produced by the light receiving element at a first timing within a period during which the light emitting element is emitting the light and also another electrical signal periodically produced by the light receiving element at a second timing within a period during which the light emitting element is not emitting the light, the length of time from the first timing to the second timing being arranged to be longer than the length of time from the second timing to the first timing.

It is a further object of this invention to provide a recording and/or reproducing apparatus which is of the kind using a recording medium having light transmissiveness in specific parts thereof and is arranged to be capable of accurately detecting the specific parts of the medium without making any erroneous detection.

Other objects and features of this invention will become apparent from the following detailed description of embodiments thereof taken in connection with the accompanying drawings.

BRIEF DESCRIPTION OF THE DRAWINGS

FIGS. 5(a) and 5(b) show in a timing chart the operation of the embodiment shown in FIG. 3.

DETAILED DESCRIPTION OF THE PREFERRED EMBODIMENTS

Figure 1:
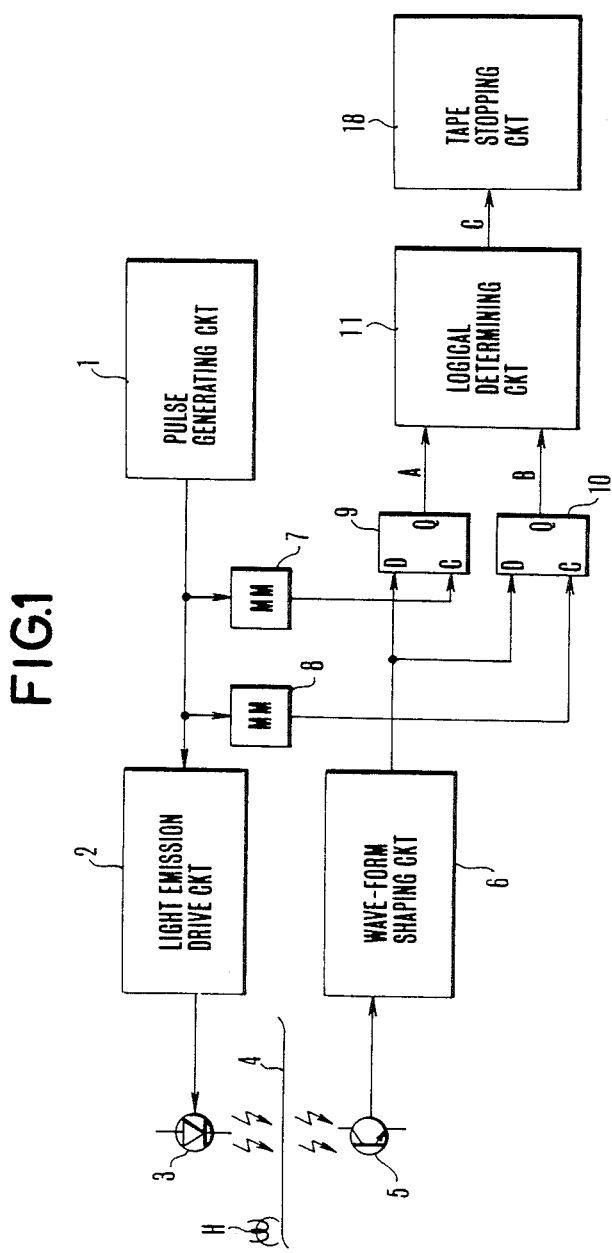
FIG. 1 is a block diagram showing in outline the arrangement of a VTR which is provided with a tape-end detecting device embodying this invention as an embodiment thereof.
Figure 2:
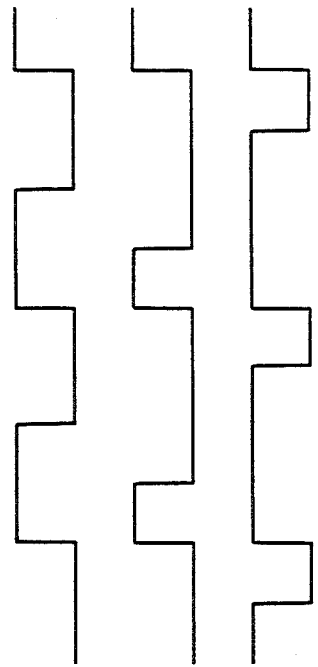
FIGS. 2(a) to 2(c) show in a timing chart the operation of the various parts of FIG. 1.

Some examples of embodiment of this invention are described in detail below:

FIG. 1 shows in outline the arrangement of a VTR having a tape-end detecting device arranged as an embodiment of this invention. FIGS. 2(a) to 2(c) show in a timing chart the operation of the same embodiment. In FIG. 1, the illustration includes a recording and/or reproducing head H; a pulse generating circuit 1; a drive circuit 2 which is arranged to cause a light emitting diode 3 to emit light; the light emitting diode 3; a magnetic tape 4 which is the object to be detected; a photo-sensitive element 5; a wave-form shaping circuit 6 which is arranged to amplify the signal output of the photo-sensitive element 5 and to shape the wave form thereof; monostable multivibrators (hereinafter referred to as MMs 7 and 8; D flip-flops 9 and 10; a logical determining circuit 11 which consists of logic circuits; and a tape stopping circuit 18 which is arranged to bring a tape moving action to a stop.

With the embodiment arranged in the above stated manner and with a pulse signal generated by the pulse generating circuit 1 as shown in FIG. 2(a), when the pulse signal is at a high level, the light emission drive circuit 2 drives the light emitting diode 3 to emit light. The light emission comes to a stop when the pulse signal is at a low level. When the tape 4 comes to its end, the light from the light emitting diode 3 passes through a transparent leader part provided at the end of the tape and thus becomes incident upon the photosensitive element 5. Therefore, the wave-form shaping circuit 6 produces a signal at a high level when the pulse signal shown in FIG. 2(a) is at a high level, and produces it at a low level when the latter is at a low level. The signal produced from the wave-form shaping circuit 6 is supplied to the D terminals of the D flip-flops 9 and 10. Meanwhile, the MMs 7 and 8 produce their signal outputs as shown in FIGS. 2(b) and 2(c). These signals from the MMs 7 and 8 are supplied to the clock terminals of the D flip-flops 9 and 10.

The D flip-flop 9 is thus arranged to sample the output of the wave-form shaping circuit 6 at the timing of light emission. The other D flip-flop 10 is arranged to sample the output of the circuit 6 at the timing of no emission of light. As a result, the D flip-flop 9 produces its Q output (A) at a high level while the other D flip-flop 10 produces its Q output (B) at a low level. This is detected by providing an exclusive OR at the logical determining circuit 11. The circuit 11 then produces a tape-end detecting signal C at a high level. In response to the high level signal C, the tape stopping circuit 18 brings a tape moving action on a tape 4 to an end.

In case that the magnetic tape 4 is not at its end, both the outputs A and B are at low levels to make the level of the output C of the logical determining circuit 11 low. In the event of having an external light incident on the photo-sensitive element 5, the output level of the wave-form shaping circuit 6 becomes high irrespectively of light emission by the light emitting diode 3. Therefore, the levels of both the outputs A and B of the flip-flops 9 and 10 become high and then the level of the output C of the determining circuit 11 becomes low.

The above stated arrangement of the tape-end detecting device enables the VTR to reliably detect only the end of the tape without erroneously detecting the tape end even in the event of incidence of external light upon the photo-sensitive element. Further, the invented arrangement of the tape-end detecting device obviates the necessity of any shielding arrangement against the external light and thus advantageously permits reduction in size and weight of the VTR.

Meanwhile, it is an important requirement for a tape-end detecting device of a VTR to be capable of promptly detecting the tape end. The tape is stopped from travelling upon detection of the tape end. Then, in rewinding the tape at a high speed, for example, if an excessively long period of time is required for detecting the tape end, there would obtain a state of having the tape completely taken up on one of the reels. That state would impose an excessive load on the tape.

Figure 3:
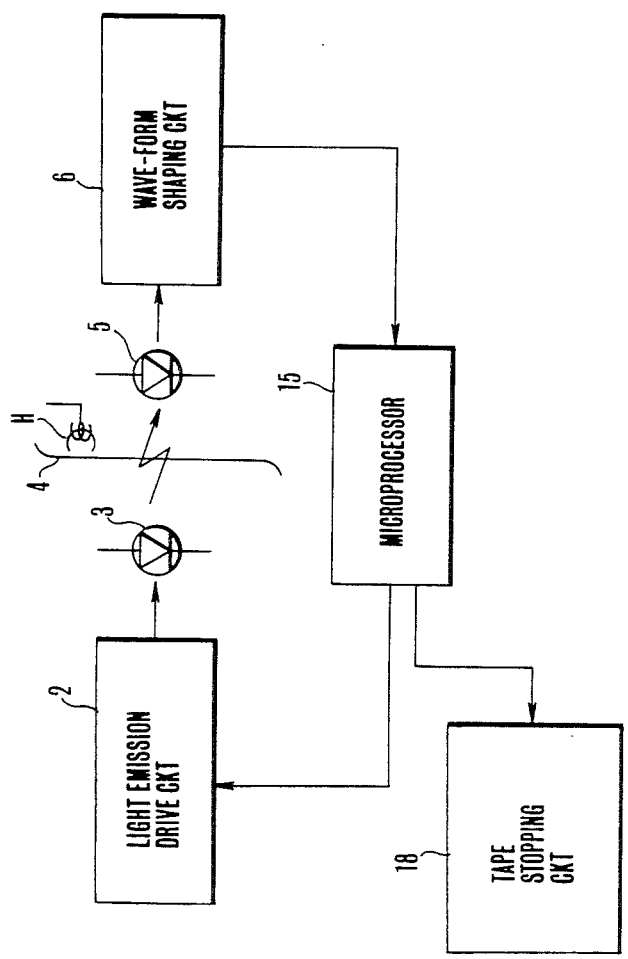
FIG. 3 is a block diagram showing in outline a VTR having a tape-end detecting device which is arranged as another embodiment of this invention.

In another embodiment of this invention, the tape-end detecting device is improved in terms of the above stated point. FIGS. 3 to 5(b) show that embodiment, FIG. 3 showing it in a block diagram, FIG. 4 in a flow chart and FIGS. 5(a) and 5(b) in a timing chart respectively. In FIG. 3, the same reference numerals as those used in FIG. 1 indicate the component elements similar to those of FIG. 1. The embodiment includes a micro-processor 15 which is arranged to generate pulses for driving the light emitting diode 3 and to perform a signal processing operation.

Figure 4:
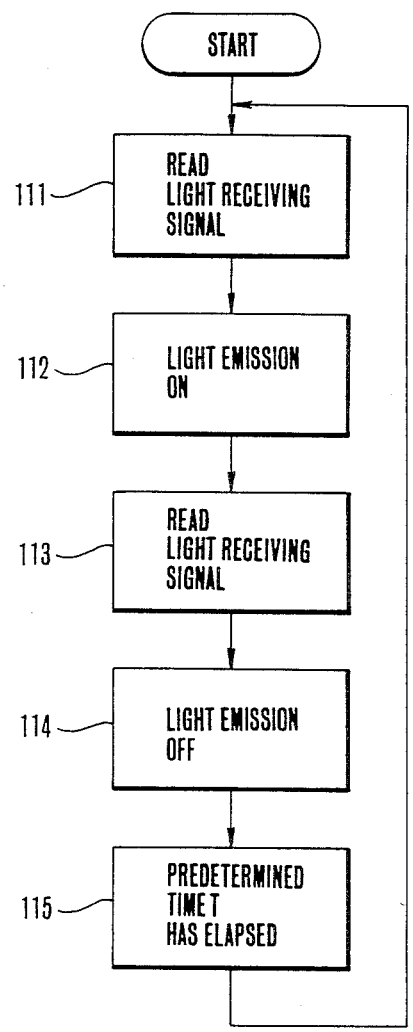
FIG. 4 is a flow chart showing a portion of the operation of a microprocessor processor included in the embodiment shown in FIG. 3.

With the embodiment arranged as shown in FIG. 3, the micro-processor 15 is arranged to perform the signal processing operation as described in the following with reference to the flow chart of FIG. 4 and the timing chart of FIGS. 5(a) and 5(b): When a light receiving signal is received at a step 111, the light emitting diode 3 is in an extinct state. Therefore, the light receiving photo-sensitive element 5 produces via the wave-form shaping circuit 6 a signal giving information about the presence or absence of external light to the micro-processor 15. Then, after the lapse of a very short period of time, the micro-processor 15 gives an instruction to the drive circuit 2 for commencement of light emission at a step 112. The light emitting diode 3 lights up. Then, at a step 113 after the lapse of a very short period of time, the light receiving signal is again taken in. Since the light emitting diode 3 is alight this time, the photo-sensitive element 5 supplies via the wave-form shaping circuit 6 information on the light transmissivity of the detected object 4 (or the tape) to the micro-processor 15. At a step 114, after the lapse of a further short period of time, the drive circuit 2 is instructed to deenergize the light emitting diode 3. The light of the diode 3 is then not present. After that, at a step 115, the level of the signal from the light receiving photo-sensitive element 5 becomes low during a predetermined period of time T while the micro-processor 15 is doing other processing work.

The timing at which the steps 111, 113, 112 and 114 are executed is as indicated by points of time a, b, c and d in FIGS. 5(a) and 5(b).

The signal obtained at the point of time "a" immediately before light emission by the light emitting diode 3 should be unvarying irrespective as to whether the magnetic tape 4 is at its end. If the information obtained at this point of time "a" from the photo-sensitive element 5 shows the presence of incident light, the light must be an external light. In this instance, therefore, any information which is obtained at the point of time "b" after light emission showing the presence of incident light is not regarded as "tape end information." In short, the tape is determined to have come to its end only where information showing the presence of incident light is obtained at the point of time "b" following light emission after information showing the absence of incident light is obtained at the point of time "a" immediately before the light emission.

FIG. 5(a) shows pulses for driving the light emitting diode 3. FIG. 5(b) shows the signal output of the photo-sensitive element 5 obtained in response to the driving pulses of FIG. 5(a). As shown, the signal produced from the photo-sensitive element 5 is characterized in that the rise of the signal is steeper than the fall thereof. The micro-processor 15 is arranged to read the signal of the photo-sensitive element 5 immediately before and after the light emission, so that it is possible to detect the end of the tape within a very short period of time.

The embodiment described is capable of reliably detecting the end of the tape without making any error. Besides, since the micro-processor 15 is arranged to readthe signal from the photo-sensitive element 5 immediately before and after the light emission by the light emitting diode 3, the embodiment is capable of very speedily detecting the end of the tape.

What is claimed is:

1. A device for discriminating a light transmissivity of an object to be discriminated, comprising:
   (a) a light emitting element;
   (b) a light control circuit arranged to intermittently send an electric current to said light emitting element in a predetermined cycle, each of the predetermined cycle having a first period during which said light control circuit is feeding the electric current to said light emitting element and a second period during which said light control circuit is not feeding the electric current to said light emitting element, and said first period being shorter than said second period;
   (c) a light receiving element which is opposed to the light emitting element across said object to be detected and is arranged to produce an electrical signal corresponding to a quantity of light received;
   (d) a first detection circuit arranged to detect the electrical signal produced by said light receiving element in the predetermined cycle at a first timing within said first period and to produce a first detection signal;
   (e) a second detection circuit arranged to detect the electrical signal produced by said light receiving element in the predetermined cycle at a second timing within said second period and to produce a second detection signal, a period of time from said first timing to said second timing being arranged to be longer than a period of time from said second timing to said first timing; and
   (f) a discrimination means for discriminating the light transmissivity of said object on the basis of said first and second detection signals.

2. A device according to claim 1 wherein said first and second detection signals are binary signals, and said discriminating means includes a logical circuit which is arranged to perform a logical computing operation on said first and second detection signals.

3. A device according to claim 2, wherein said discriminating means is arranged to discriminate that the object to be detected is light transmissive when the states of said first and second detection signals are in a converse relation.

4. A device according to claim 1, wherein said discriminating means includes a micro-processor.

5. A recording and/or reproducing apparatus for recording or reproducing a signal on or from a tape-shaped recording medium which is arranged to be transparent only in specific parts, comprising:
   (a) a head arranged to record a signal on said recording medium and/or to reproduce a signal from said recording medium;
   (b) a light emitting element;
   (c) a light control circuit arranged to intermittently send an electric current to said light emitting element in a predetermined cycle, each of the predetermined cycle having a first period during which said light control circuit is feeding the electric current to said light emitting element and a second period during which said light control circuit is not feeding the electric current to said light emitting element, and said first period being shorter than said second period;
   (d) a light receiving element which is opposed to the light emitting element across said object to be detected and is arranged to produce an electrical signal corresponding to the quantity of light received;
   (e) a first detection circuit arranged to detect the electrical signal produced by said light receiving element in the predetermined cycle at a first timing within said first period and to produce a first detection signal;
   (f) a second detection circuit arranged to detect the electrical signal produced by said light receiving element in the predetermined cycle at a second timing within said second period and to produce a second detection signal, a period of time from said first timing to said second timing being arranged to be longer than a period of time from said second timing to said first timing; and
   (g) stopping means arranged to bring a moving action on said recording medium to a stop on the basis of said first and second detection signals.

* * * * *